United States Patent [19]

Stairs

[11] Patent Number: 5,031,657
[45] Date of Patent: Jul. 16, 1991

[54] VANDAL-PROOF COVER FOR A FAUCET

[75] Inventor: Henry M. Stairs, Ligonier, Pa.

[73] Assignee: American Standard Inc., New York, N.Y.

[21] Appl. No.: 560,673

[22] Filed: Jul. 31, 1990

[51] Int. Cl.⁵ .............................................. F16K 51/00
[52] U.S. Cl. .................................... 137/327; 137/801; 251/291; 4/192
[58] Field of Search ................ 251/291, 292; 137/327, 137/328, 315, 801, 377, 15; 4/192

[56] References Cited

U.S. PATENT DOCUMENTS

| | | | |
|---|---|---|---|
| 2,864,398 | 12/1958 | Green | 137/327 |
| 2,964,290 | 12/1960 | Mueller | 251/291 |
| 4,552,171 | 11/1985 | Farrell et al. | 4/192 |
| 4,685,487 | 8/1987 | Dordack et al. | 137/315 |
| 4,739,788 | 4/1988 | Reback | 137/15 |
| 4,961,443 | 10/1990 | Buccicone et al. | 137/315 |

Primary Examiner—A. Michael Chambers
Attorney, Agent, or Firm—Blum Kaplan

[57] ABSTRACT

A cover for a single lever faucet having a body with a spout extending therefrom and a control handle for controlling the amount and mixture of water flowing out of the spout. The faucet includes a threaded opening extending into the body and through an unthreaded opening of the control handle. The cover includes a decorative cap having a threaded pin extending therefrom and adapted to be threaded into the threaded opening of the body. The cap includes a lateral opening therein for permitting receipt of a tool for tightening and removing the cap on the faucet. The cap is essentially non-removable by ordinary hand manipulation.

3 Claims, 4 Drawing Sheets

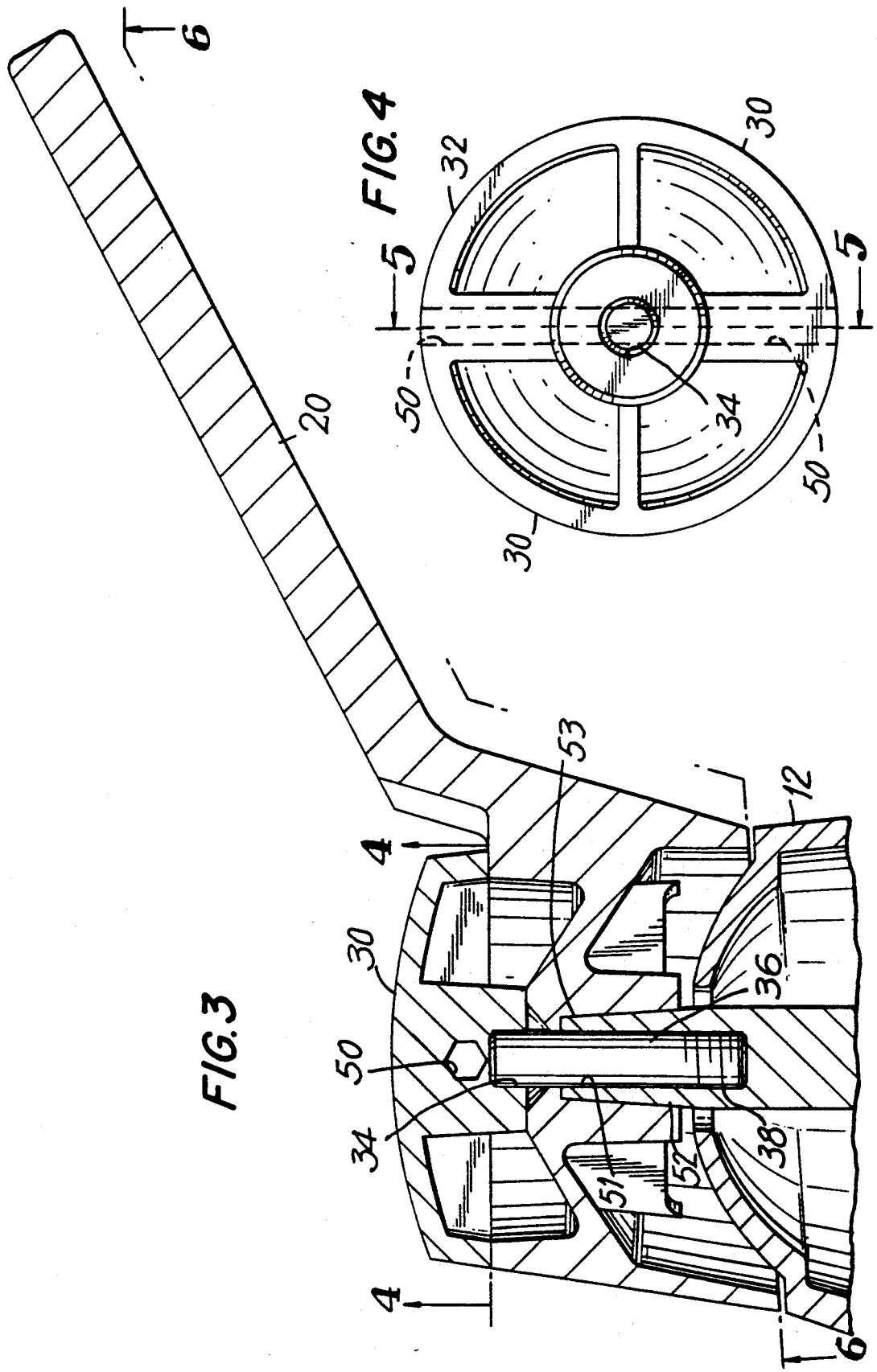

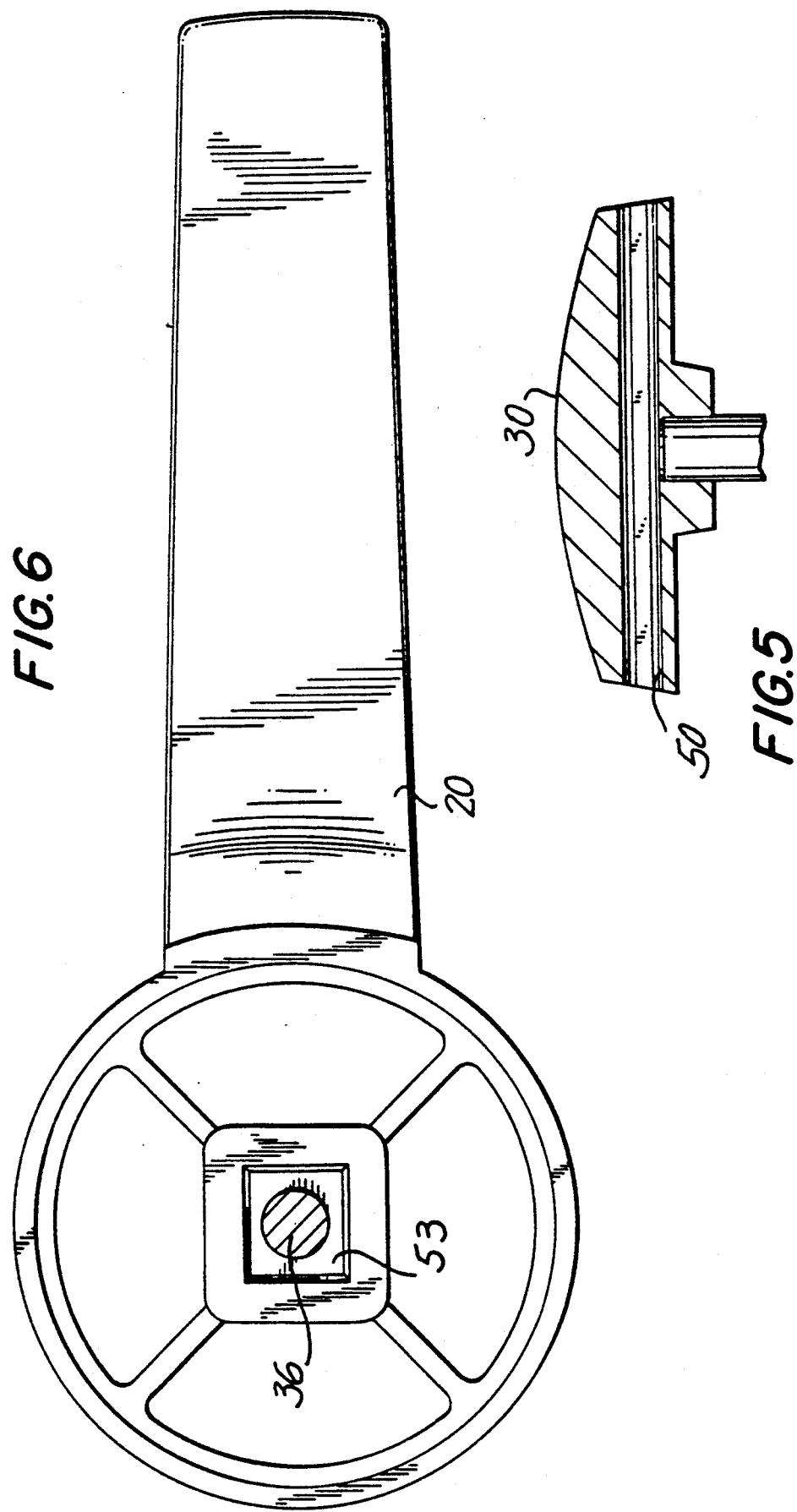

VANDAL-PROOF COVER FOR A FAUCET

BACKGROUND OF THE INVENTION

The present invention is directed to a vandal-proof cover for a faucet and, in particular, to a decorative cover for the water control lever in a single handle faucet which is adapted for both commercial/industrial applications and residential use since the cover can only be removed with a special tool.

Single lever handle faucets generally include a faucet body which centrally houses the plumping valve components and having a spout extending therefrom. A single handle lever is supported on the faucet body and, through appropriate pivoting and rotation, controls the hot and cold water mixture and the water pressure of the water flowing through the spout. Conventional single lever handle faucets include a single handle lever which is held to the faucet body by a conventional screw adapted to be removed by a flat head or phillips head screwdriver. A plastic or metal cap is snapped over the central opening which receives the screw. This decorative cap is easily removed by turning or snapping it out of its socket.

When such faucet constructions are used in commercial or industrial applications, it often happens that the cap is removed and discarded by vandals, thereby destroying the appearance of the faucet. In addition, when such cap is removed, the main screw holding the faucet assembly together is exposed and can also be removed by a vandal desirous of vandalizing the faucet especially since a regular screwdriver can be used to remove the screw.

Accordingly, it is desired to provide a vandal-proof cover for a faucet which, while decorative, essentially prevents vandalism to the faucet from occurring as in prior art constructions.

SUMMARY OF THE INVENTION

Generally speaking, in accordance with the present invention, a cover for a single lever faucet having a body with a spout extending therefrom and a control handle for controlling the amount and mixture of water flowing out of the spout is provided. The faucet includes a threaded opening extending into the body under the control handle. The cover includes a decorative cap having a screw extending therefrom and adapted to be threaded into the threaded opening in the faucet body. The cover includes an opening or other means thereon which permits final tightening of the cap through the cover into the faucet body by a special tool. After tightening, the cap cannot be removed through manual manipulation. A special tool must be utilized to remove the cap thereby making the cover assembly essentially vandal-proof.

Accordingly, it is an object to the present invention to provide a vandal-proof cover for a faucet.

Another object of the present invention is to provide a cover for a single lever faucet assembly which can only be removed through the use of a special tool.

A further object of the present invention is to provide a vandal-proof cover for a faucet which is decorative in appearance yet essentially prevents vandalism to the faucet from taking place.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is an enlarged sectional view taken along line 3—3 of FIG. 2;

FIG. 4 is a sectional view taken along line 4—4 of FIG. 3;

FIG. 5 is a sectional view taken along line 5—5 of FIG. 4; and

FIG. 6 is a sectional view taken along line 6—6 of FIG. 3.

DETAILED DESCRIPTION OF THE PREFERRED EMBODIMENT

Figure 1:
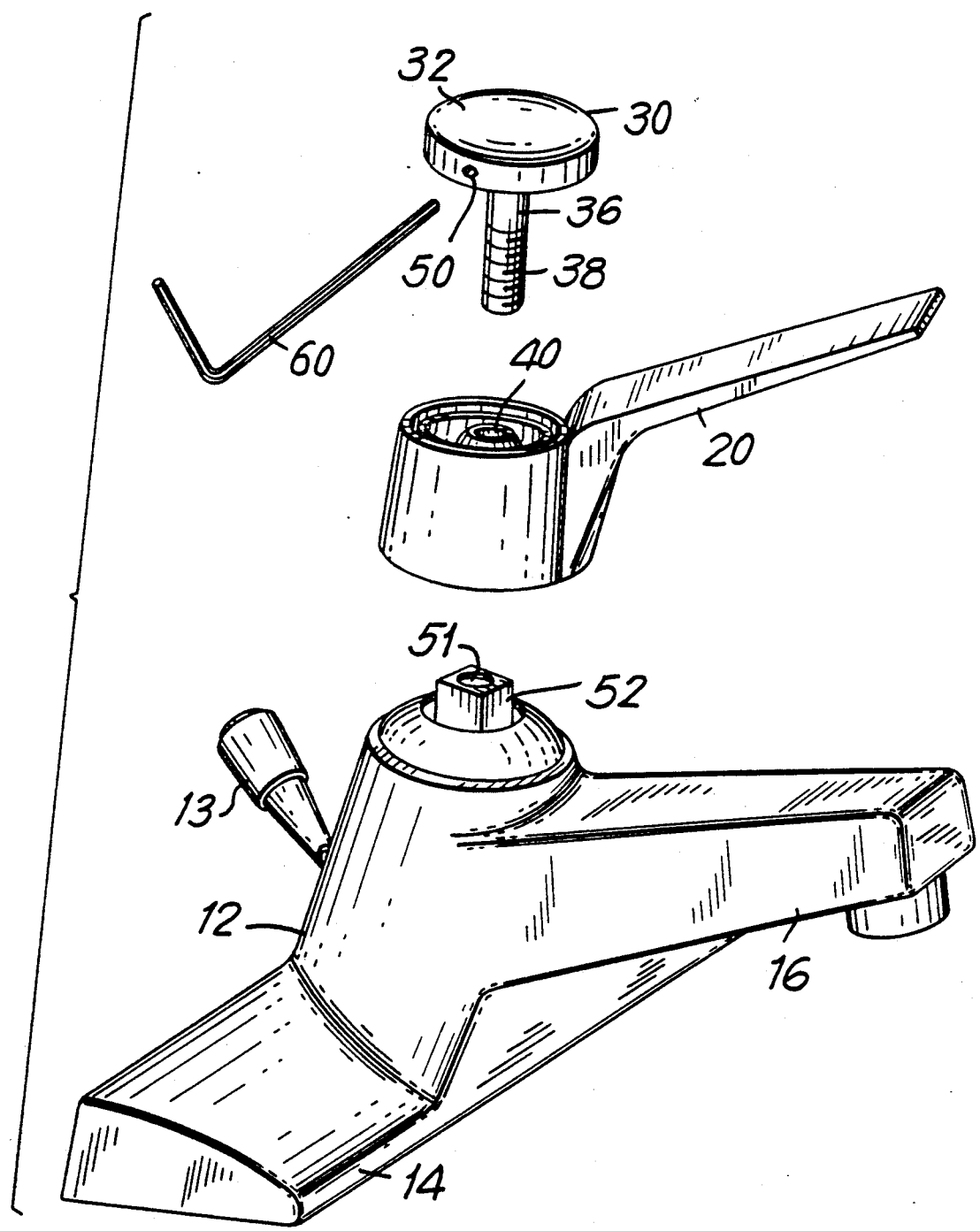
FIG. 1 is a perspective view, partially exploded, showing a single lever handle faucet about to receive a vandal-proof cover through the use of a special tool, constructed in accordance with a preferred embodiment of the present invention.
Figure 2:
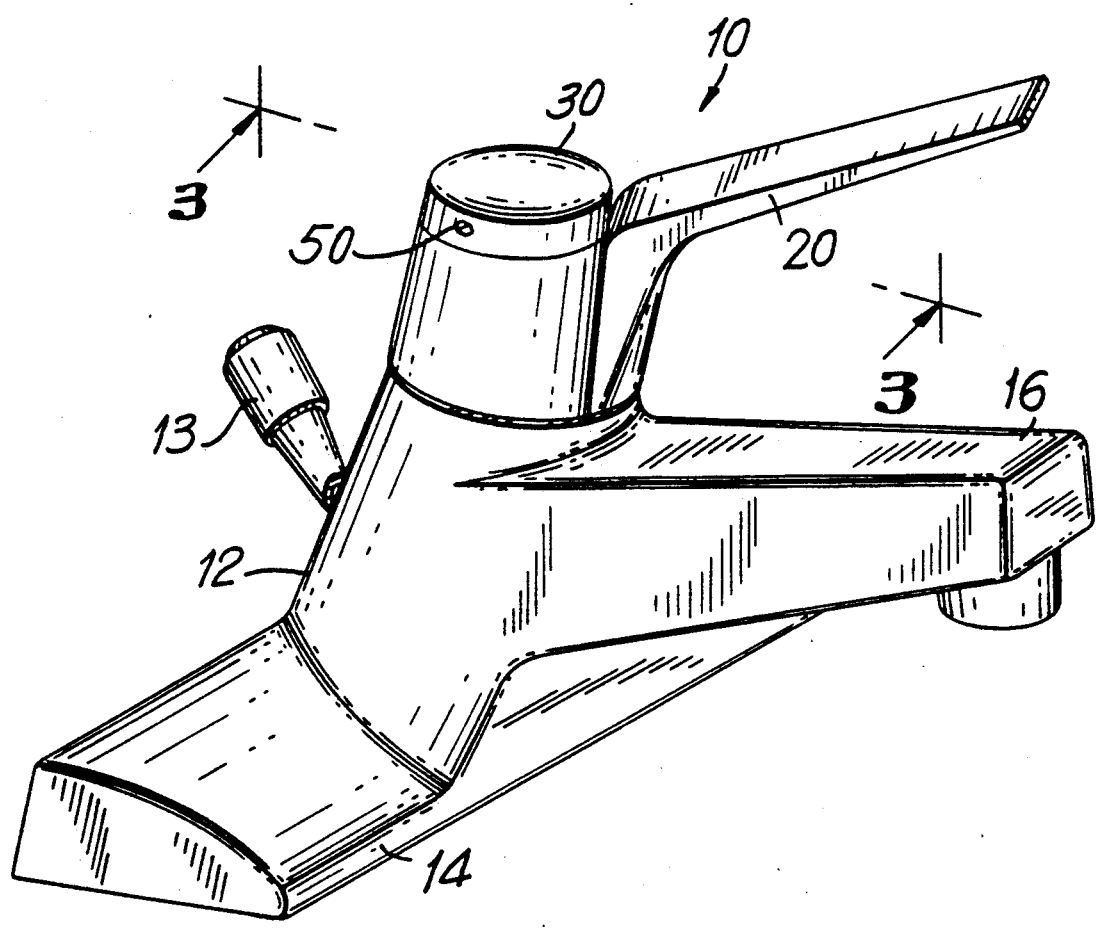
FIG. 2 is a perspective view similar to FIG. 1 but showing the cover in place on the faucet.

Reference is made to the drawing figures which depict a faucet, generally indicated at 10, having a faucet body 12, a single water control lever 20 and a vandal-proof cover 30 constructed in accordance with a preferred embodiment of the present invention. Faucet body 12 includes an integral escutcheon 14 appropriately sized to cover the openings in a sink basin through which the hot and cold water lines and drain lever extend. A faucet spout 16 extends outwardly from faucet body 12 and is adapted to deliver the mixture of hot and cold water into the sink basin. The faucet may also include a drain control rod assembly 13, as desired.

Vandal-proof cover 30 includes a cap 32 constructed of an appropriate material to match the design characteristics of faucet 10. Hence, cap 32 may be constructed of metal, plastic or any other appropriate material. Cap 32 also has an appropriate decorative appearance so as to correspond to the overall design characteristics of faucet 10. The appropriate plumbing components including the hot and cold water mixing chamber are housed within the body of plumbing fixture 10.

Cover 30 includes a centrally located opening 34 on the underside thereof which supports a projecting pin 36 having threads 38 at the opposite end thereof. Projecting pin 36 is appropriately secured in opening 34 of cover 30 by means of integral forming, adhesive or the like so as to become rotatable with cap 32.

An appropriate opening 40 in water control lever 20 is adapted to freely receive threaded end 38 of projecting pin 36. An appropriate threaded opening 51 in projection 52 of the internal plumbing mechanism of faucet 10 is adapted to tightly receive threaded end 38 of projecting pin 36. The torque required to thread pin 36 into and out of opening 51 is generally greater than the normal torque that can be exerted by the hand of a person attempting to remove cover 30 with respect to the plumbing fitting. Accordingly, cover 30, once secured in place on plumbing fitting 10, cannot be removed by manual rotation thereof Without the use of an appropriate tool as described below.

The underside (FIG. 6) of water control lever 20 includes a shaped rectangular recess 53 which conforms in shape and size to match projection 52 of the internal plumbing mechanism.

In the preferred embodiment, cap 32 of vandal-proof cover 30 includes an opening 50 through which an appropriate tool such as an allen wrench 60 can be inserted to permit an additional moment of torque to be exerted to permit removal of cover 30. By providing an appropriately shaped opening 50 in which only a special tool such as allen wrench 60 can be inserted, vandal-proof cover 30 cannot be removed using a conventional screwdriver. Rather, a nonconventional tool, such as a allen wrench, which is not normally carried by a vandal is required to remove cover 30. Hence, cover 30 becomes a vandal-proof cover under normal circumstances.

In accordance with the present invention, a vandal-proof cover which can have any decorative appearance desired is provided which cannot be removed with ordinary tools such as screwdrivers or the like. A special sized and configured tool, one not normally carried by vandals, is required to remove the cap. Accordingly, faucets incorporating the vandal-proof cover of the present invention will be less likely to be vandalized or otherwise damaged when placed in industrial or commercial applications. On the other hand, the cap can be appropriately configured so as to provide a decorative appearance so that the faucet using such vandal-proof cover can also be used in domestic or commercial installations where attractive appearance is desired.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A cover for a single lever faucet having a body with a spout extending therefrom and a control handle having an opening therethrough for controlling the amount and mixture of water flowing out of said spout, said faucet body having a threaded opening in alignment with the opening in said control handle, comprising a decorative cap having a threaded pin extending therefrom and adapted to be placed through the opening in said control handle and threaded into said threaded opening, said cap including a lateral opening therein for permitting receipt of a tool for tightening and removing said cap on said faucet, said cap being essentially non-removable by ordinary hand manipulation.

2. The cover as claimed in claim 1, wherein said lateral opening is sized to receive an allen wrench.

3. The cover as claimed in claim 1, wherein said lateral opening in said cap extends through said cap.

* * * * *